(12) United States Patent
Liao

(10) Patent No.: US 7,384,021 B2
(45) Date of Patent: Jun. 10, 2008

(54) ROTATION MECHANISM FOR TELEVISIONS

(76) Inventor: Chun-Chieh Liao, P.O. Box 44-2049, Taipei (TW) 10668

(*) Notice: Subject to any disclaimer, the term of this patent is extended or adjusted under 35 U.S.C. 154(b) by 282 days.

(21) Appl. No.: 11/385,810

(22) Filed: Mar. 22, 2006

(65) Prior Publication Data

US 2007/0221810 A1    Sep. 27, 2007

(51) Int. Cl.
*F16M 13/00* (2006.01)
(52) U.S. Cl. .......... 248/415; 248/176.3; 248/349.1; 248/919; 348/827
(58) Field of Classification Search .......... 248/678, 248/349.1, 176.3, 186.2, 917, 919, 921, 922, 248/131, 415, 418, 425, 121, 125.7; 108/103, 108/104, 139; 348/825, 827; 74/425, 89.14; 361/681–683
See application file for complete search history.

(56) References Cited

U.S. PATENT DOCUMENTS

| | | | | |
|---|---|---|---|---|
| 3,559,942 A | * | 2/1971 | Lucasey | 248/278.1 |
| 4,591,123 A | * | 5/1986 | Bradshaw et al. | 248/179.1 |
| 5,243,434 A | * | 9/1993 | Nodama | 348/827 |
| 6,105,919 A | * | 8/2000 | Min | 248/418 |
| 6,958,902 B2 | * | 10/2005 | Tseng et al. | 361/681 |

* cited by examiner

*Primary Examiner*—Korie H. Chan

(57) ABSTRACT

A rotation mechanism of a television includes a rotation unit, a box, a frame which is connected on the box and connected with the television, and a driving unit. The driving unit has a stationary fan-shaped rack with a positioning rod and a pivot. The rack is connected to the rotation unit and box is rotated about the rack when the driving unit is activated so that the rotation unit and the frame are rotated. By this arrangement, the television is rotated with the rotation unit.

10 Claims, 8 Drawing Sheets

ROTATION MECHANISM FOR TELEVISIONS

BACKGROUND OF THE INVENTION

1. Field of the Invention

The present invention relates to a rotation mechanism for televisions or monitors and the rotation mechanism is driven by a motor which can be controlled by a remote controller.

2. Description of the Prior Arts

A conventional LCD television set 40 is shown in FIG. 1 and generally includes a base 401 and the television 402 is connected to the base 401. The screen of the television 402 is oriented to a certain direction so that if the viewers are located at an angle relative to the screen, the viewers cannot see the programs on the screen clearly because of refection. Therefore, the viewers have to rotate the television 402 to adjust the angle that the screen faces and the viewers usually adjust the television 402 several times back and forth.

The present invention intends to provide a rotation mechanism which includes a driving unit to rotate the television within a pre-set range of angles.

SUMMARY OF THE INVENTION

The present invention relates to a rotation mechanism of a television, wherein the rotation mechanism comprises a rotation unit having a base disk and a plurality of curved slots are defined through the base disk. A top disk has a through holes which are located corresponding to the curved slots. A rotation disk is located between the base disk and the top disk. A plurality of rollers are located between the rotation disk and the top disk so as to reduce friction therebetween. A plurality of connection members extend through the curved slots and the through holes so as to connect the base disk and the top disk. The connection members are movably engaged with the curved slots. A box is fixed on the top disk and has an interior. A driving unit has a driving member which is movably located on the box and a driving gear received in the interior is driven by the driving member. A spiral hear is engaged with the driving gear and connected with a shaft. A stationary fan-shaped rack is engaged with the spiral gear and has a positioning rod extending from an underside of the rack. The positioning rod extends through the rotation unit and is fixed on the base disk. A pivot extends through the rack extends through the box, the rotation unit and is fixed on the base disk. A frame is fixed on the rotation unit and connected with the television.

The primary object of the present invention is to provide a rotation mechanism which includes a motor so as to rotate the television.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENTS

Figure 1:
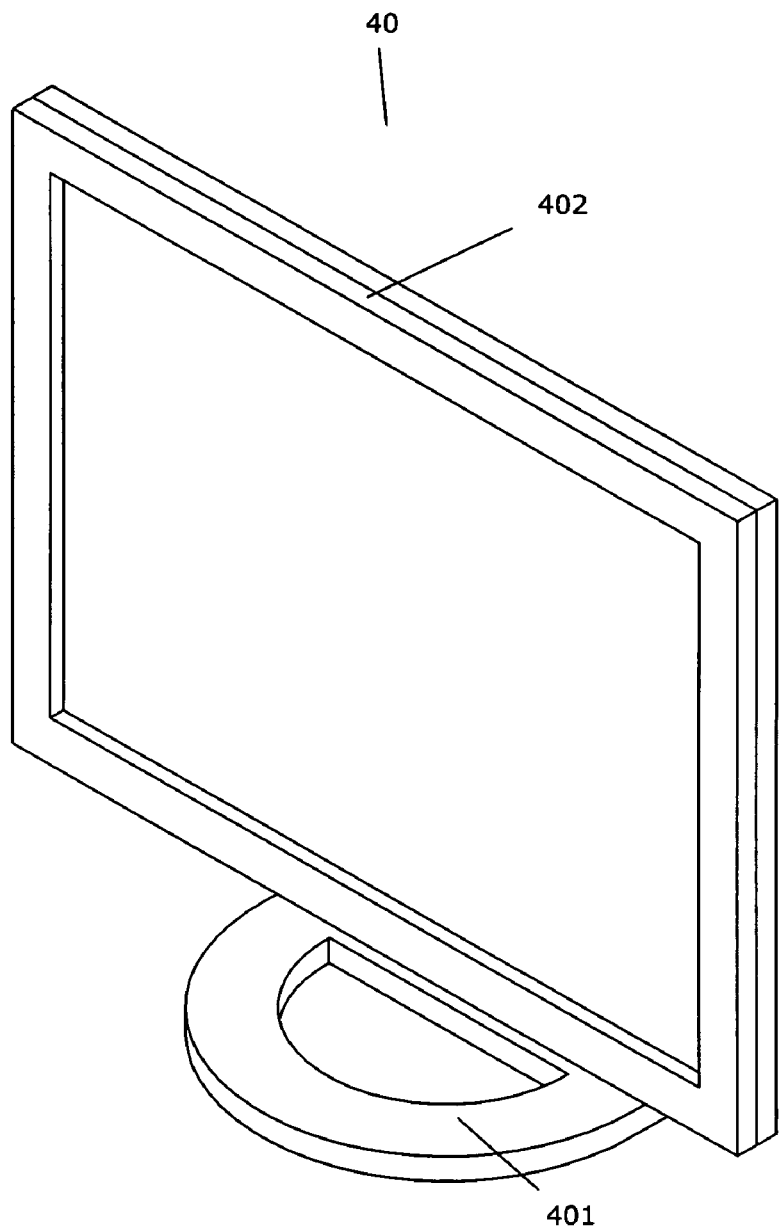
FIG. 1 shows a conventional television supported on a base.
Figure 2:
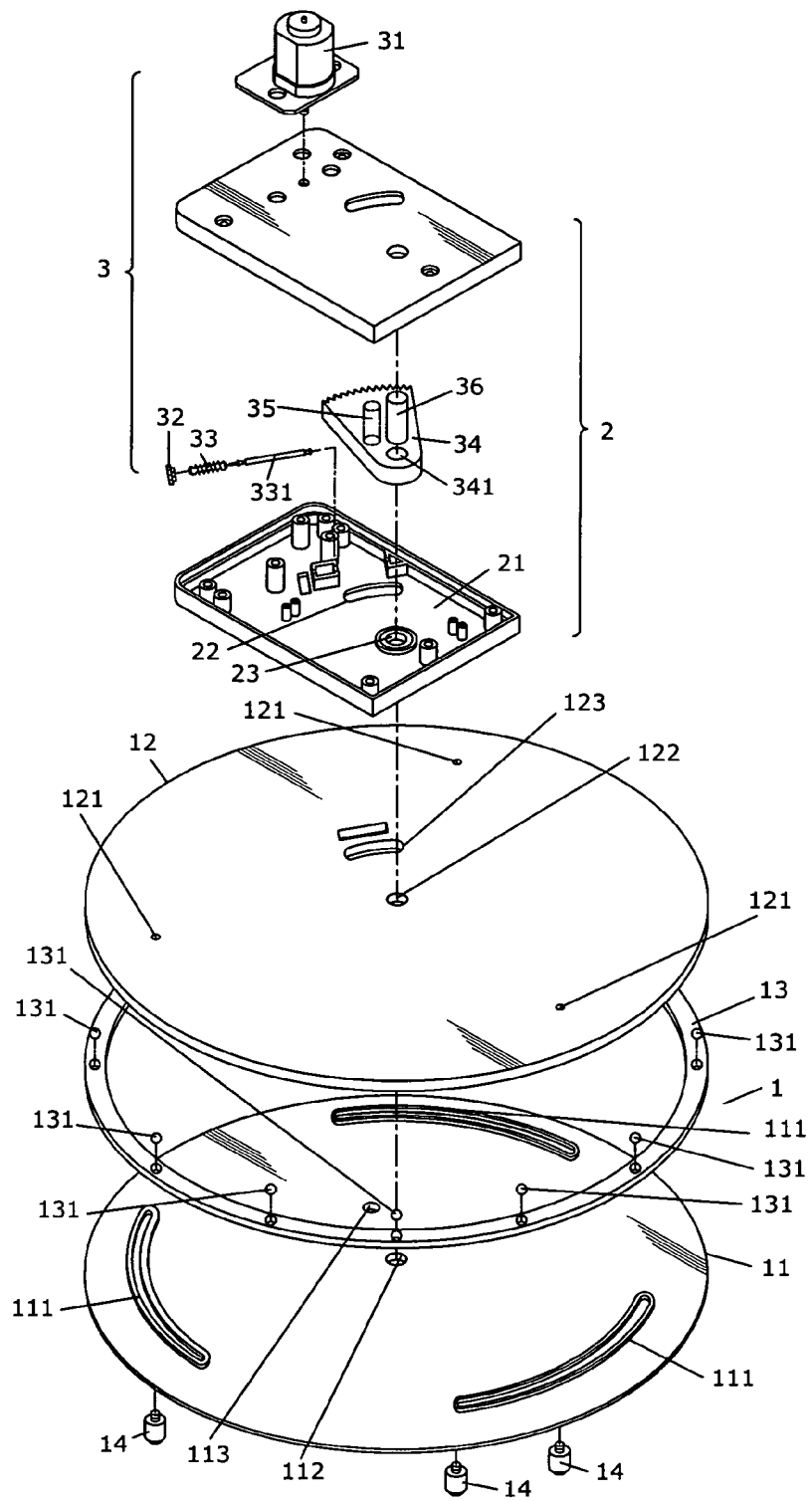
FIG. 2 is an exploded view to show the rotation mechanism of the present invention.
Figure 3:
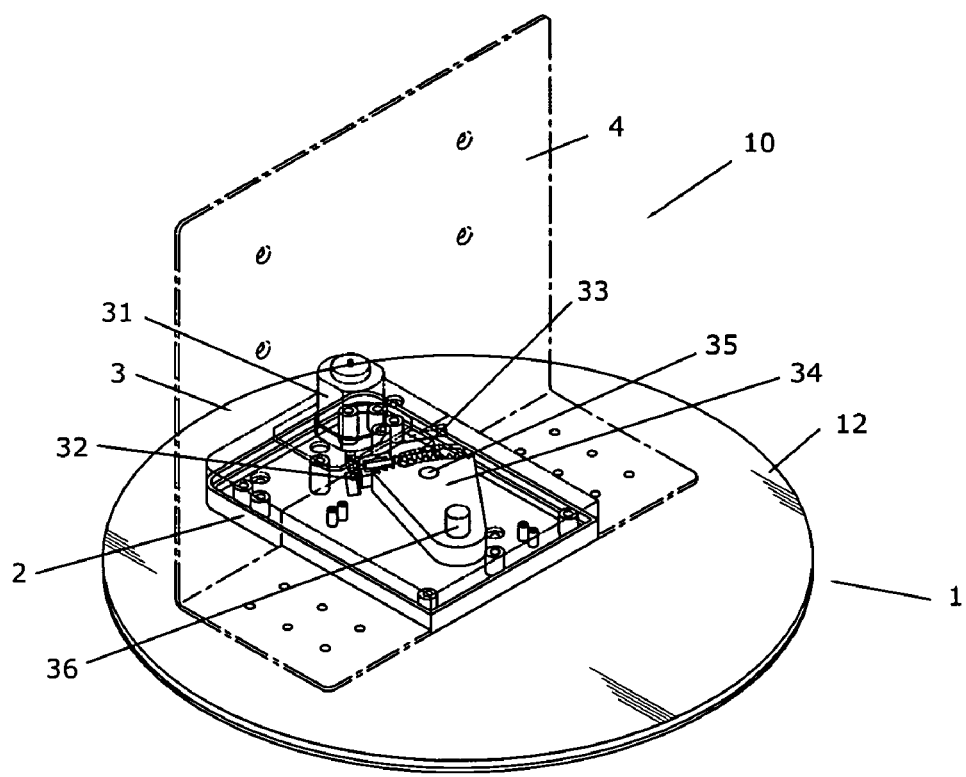
FIG. 3 is a perspective view to show the rotation mechanism of the present invention.
Figure 4:
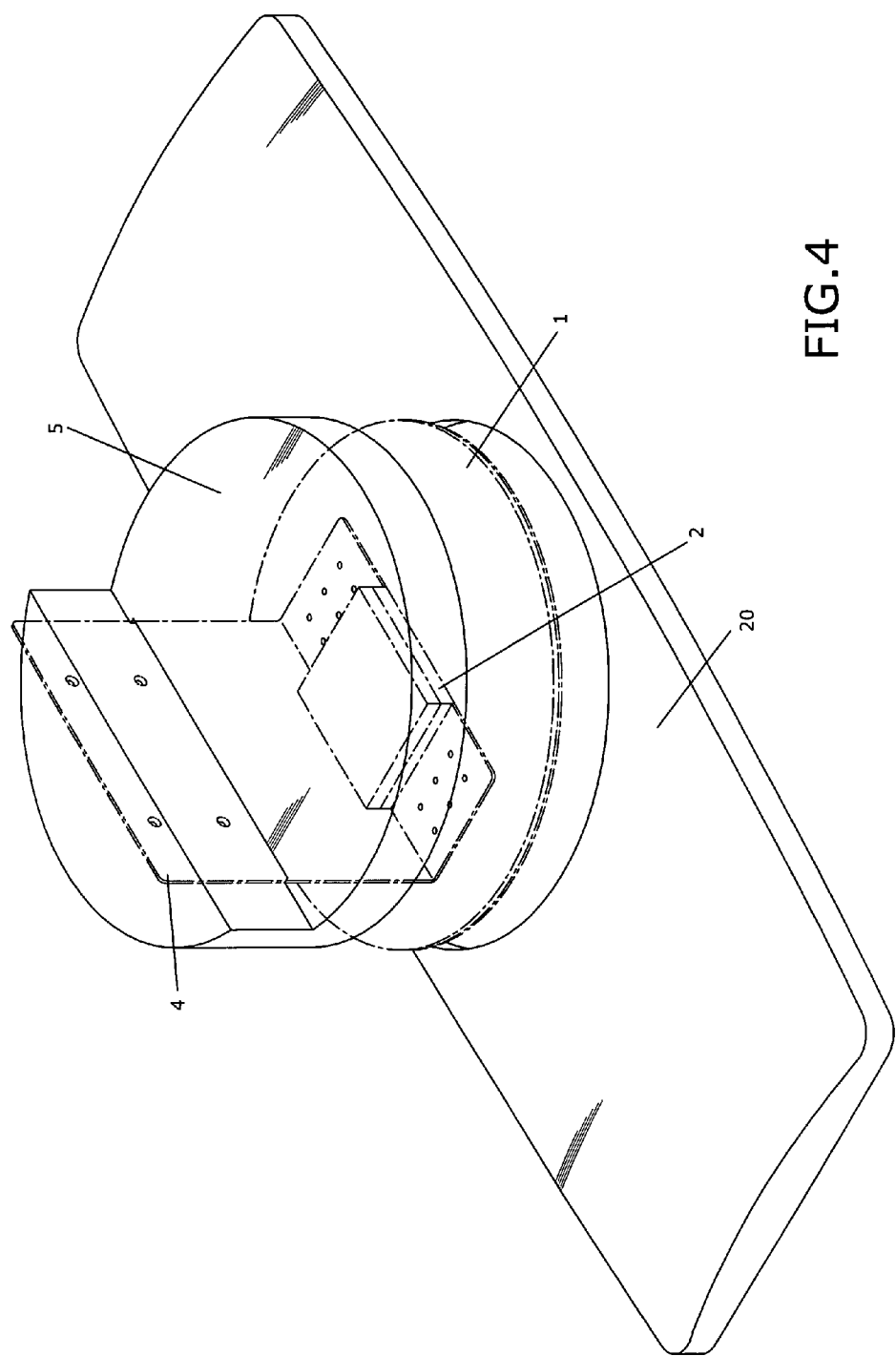
FIG. 4 shows a casing is connected to the rotation mechanism of the present invention.
Figure 5:
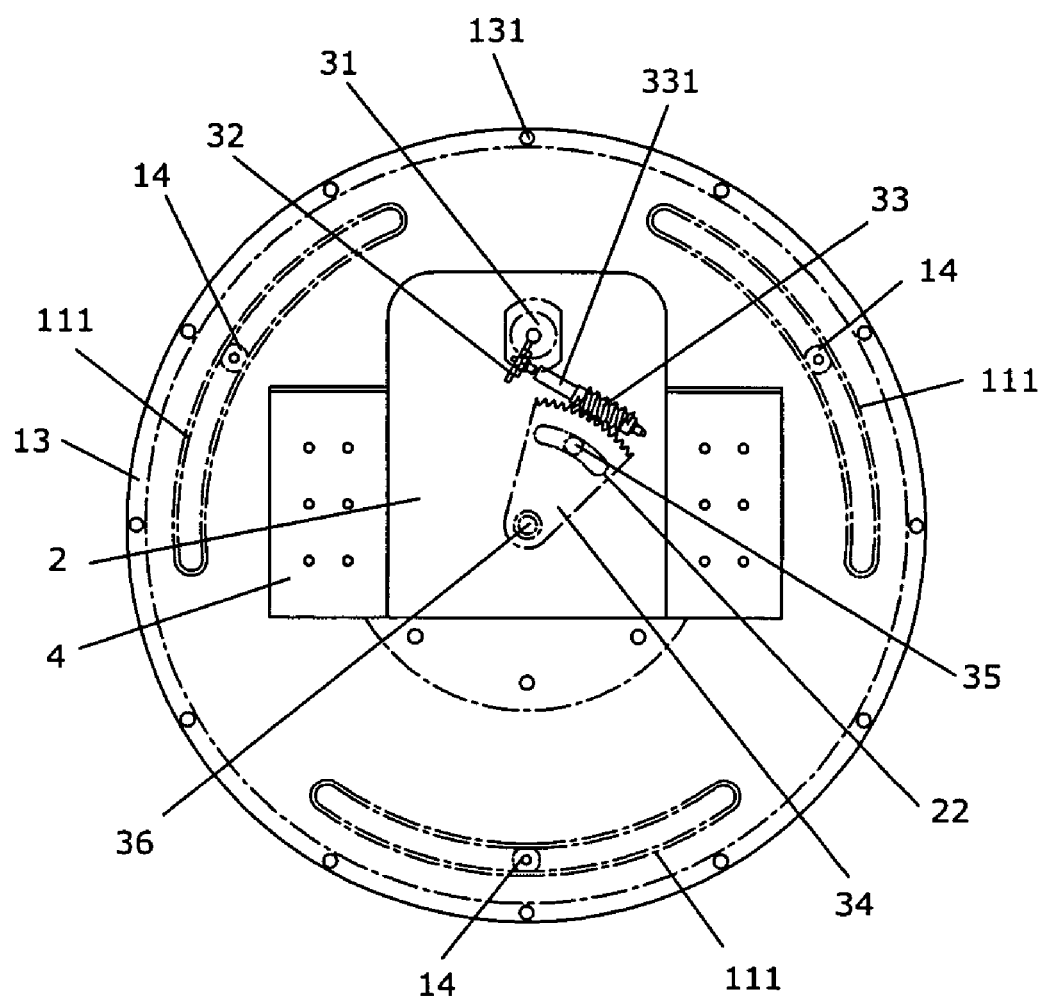
FIG. 5 shows a top view of the rotation mechanism of the present invention.

Referring to FIGS. 2 to 5, the rotation mechanism 10 of a television 30 of the present invention comprises a rotation unit 1 having a base disk 11, a top disk 12 and a rotation disk 13 which is located between the top disk 12 an the base disk 11. The base disk 11 includes a plurality of curved slots 111, a pivotal hole 112 and a circular hole 113 defined therethrough. The top disk 12 has a through holes 121, a central hole 122 and an elongate slot 123, wherein the through hole 121 are located corresponding to the curved slots 111, the central hole 122 is located corresponding to the pivotal hole 112, and the elongate slot 123 is located corresponding to the circular hole 113. A plurality of rollers 131 are located on the rotation disk 13 and in contact with the top disk 12 so as to reduce friction between the rotation disk 13 and the top disk 12. A plurality of connection members 14 such as screws extend through the curved slots 111 and the through holes 121 so as to connect the base disk 11 and the top disk 12. The connection members 14 are movably engaged with the curved slots 111.

A box 2 is fixed on the top disk 12 and having an interior 21 and a connection hole 23.

A driving unit 3 has a driving member 31 such as a motor which is movably located on the box 2. A driving gear 32 is received in the interior 21 of the box 2 and is driven by the driving member 31. A spiral hear 33 is engaged with the driving gear 32 and connected with a shaft 331. A stationary fan-shaped rack 34 is engaged with the spiral gear 33 and has a positioning rod 35 extending from an underside of the rack 34. The positioning rod 35 extends through the limitation slot 22, the elongate slot 123 and the circular hole 113 so as to be fixed on the base disk 11. The positioning rod 35 is movably inserted in the limitation slot 22. A pivot 36 extends through a connection hole 341 defined through the rack 34, the central hole 122 of the top disk 12 and is connected with the pivotal hole 112 in the base disk 11. A frame 4 is fixed on the rotation unit 1 and connected with the television 30. A casing 5 is mounted to the rotation mechanism 10 and located above the box 2 so as to have better outer appearance.

Figure 6:
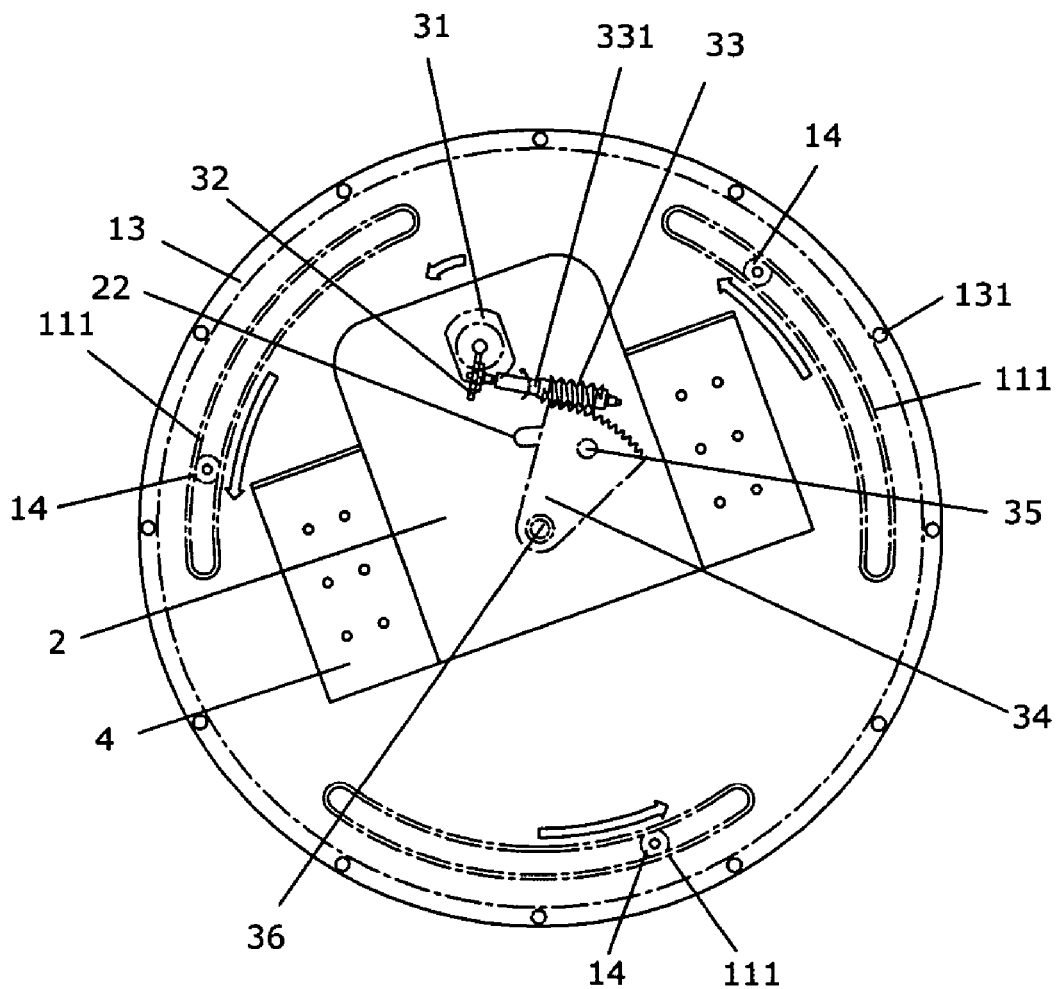
FIGS. 6 and 7 show that the rotation mechanism of the present invention is rotated in two opposite directions.
Figure 7:
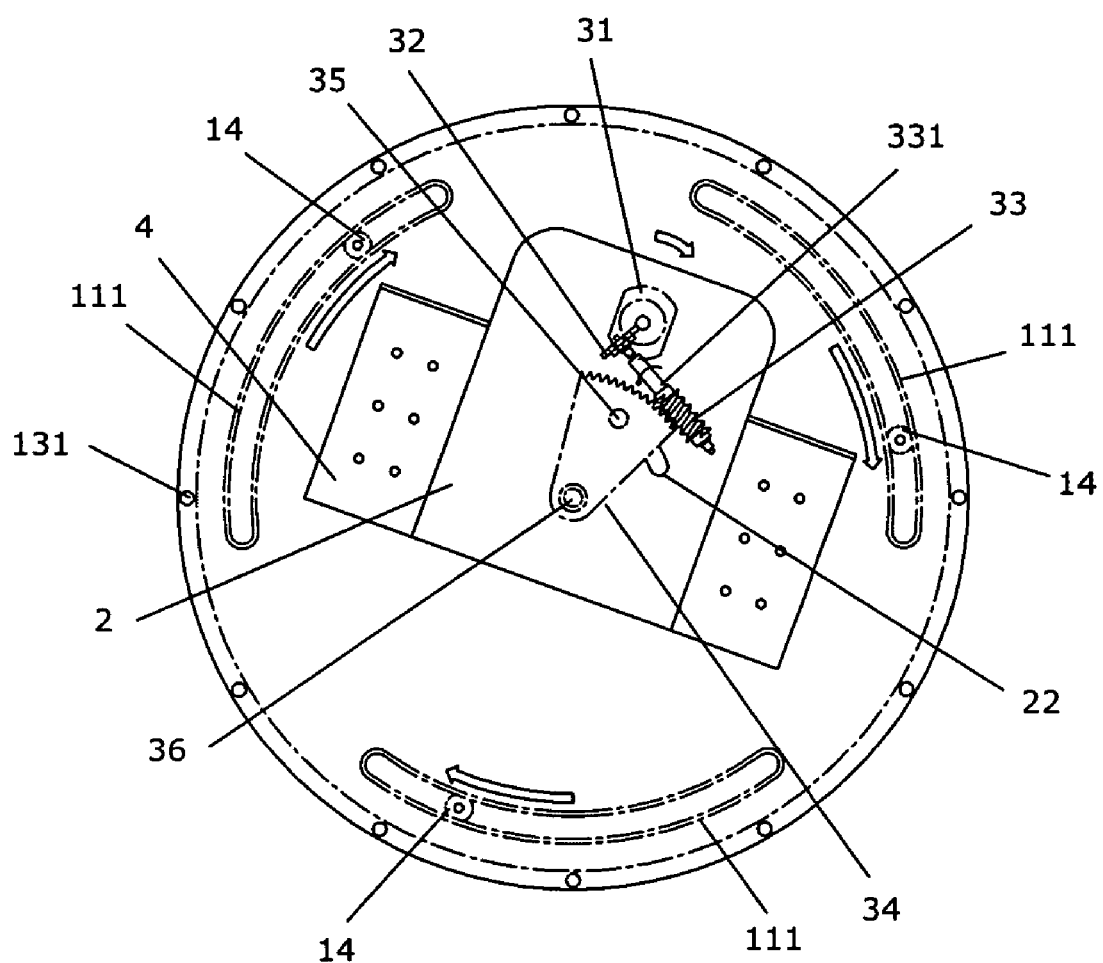
Figure 8:
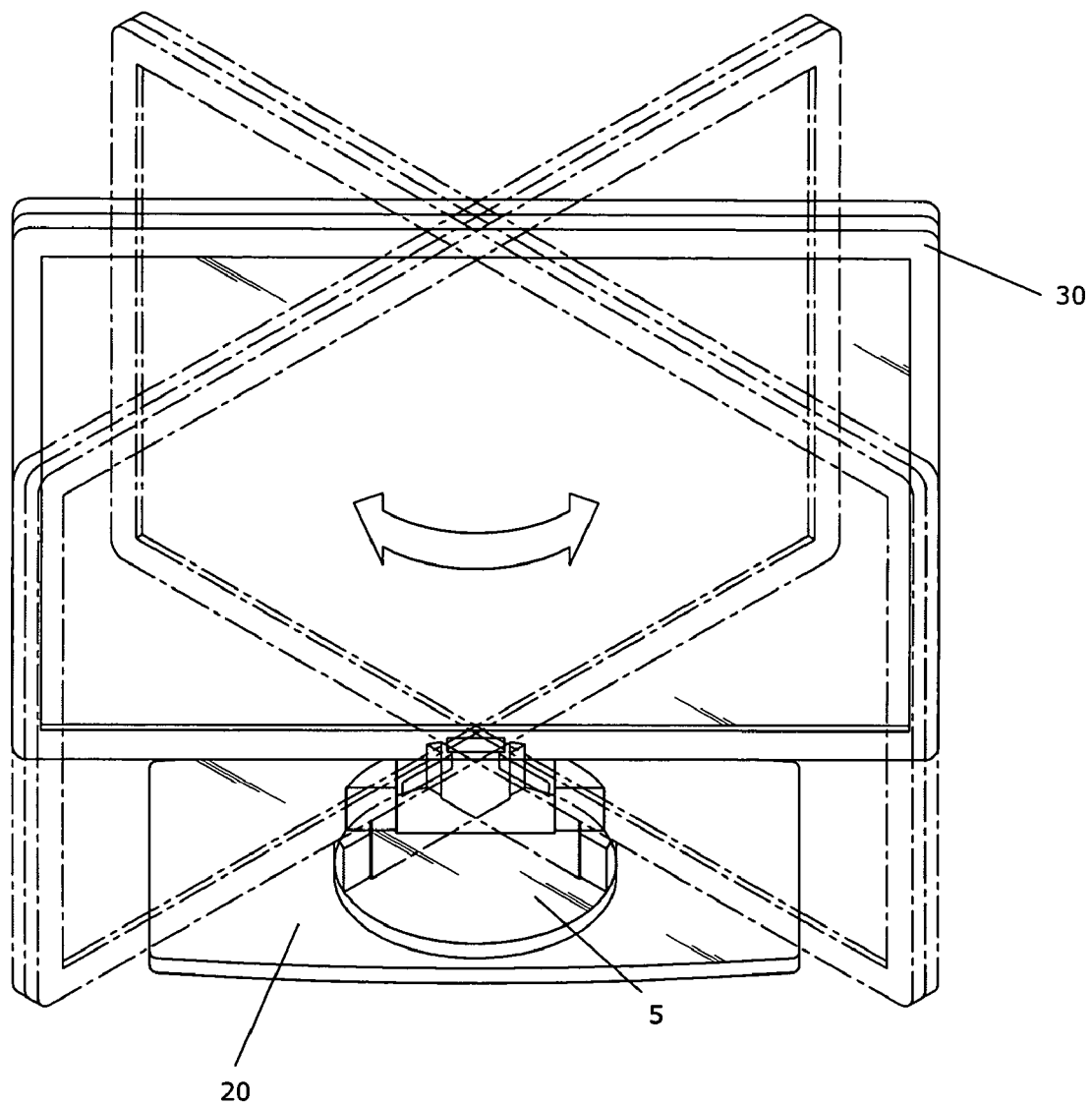
FIG. 8 shows that a television connected to the frame is rotated by the rotation mechanism of the present invention.

As shown in FIGS. 6, 7 and 8, when the spiral gear 33 rotates in either one of tow opposite directions, because the rack 34 is stationary, the box 2 is rotated about the rack 34 and the top disk 12 together with the frame 4 are rotated such that the television 30 is rotated with the frame 4. It is noted that the driving member 31 can be controlled by using a remote controller so that the user does not need to pivot the television 30 back and forth. The positioning rod 35 is movably inserted in the limitation slot 22 so as to prevent from over turning.

While we have shown and described the embodiment in accordance with the present invention, it should be clear to those skilled in the art that further embodiments may be made without departing from the scope of the present invention.

What is claimed is:

1. A rotation mechanism of a television, comprising:

a rotation unit having a base disk and a plurality of curved slots defined through the base disk, a top disk having through holes which are located corresponding to the curved slots, a rotation disk located between the base disk and the top disk, a plurality of rollers located on the rotation disk and being in contact with the top disk, a plurality of connection members extending through the curved slots and the through holes so as to connect the base disk and the top disk, the connection members movably engaged with the curved slots;

a box fixed on the top disk and having an interior;

a driving unit having a driving member which is movably located on the box, a driving gear received in the interior of the box and driven by the driving member, a spiral gear engaged with the driving gear and connected with a shaft, a stationary fan-shaped rack engaged with the spiral gear and having a positioning rod extending from an underside of the rack, the positioning rod extending through the rotation unit and being fixed on the base disk, a pivot extending through the rack, the box, the rotation unit and fixed on the base disk, and a frame fixed on the rotation unit and connected with the television, when the spiral gear rotates, the box is rotated about the rack and the top disk together with the frame are rotated such that the television is rotated with the frame.

2. The rotation mechanism as claimed in claim 1, wherein a casing is mounted on the rotation mechanism.

3. The rotation mechanism as claimed in claim 1, wherein the base disk has a circular hole through which the positioning rod extends.

4. The rotation mechanism as claimed in claim 1, wherein the base disk has a pivotal hole through which the pivot extends.

5. The rotation mechanism as claimed in claim 1, wherein the top disk has an elongate slot through the positioning rod extends.

6. The rotation mechanism as claimed in claim 1, wherein the top disk has a central hole through which the pivot extends.

7. The rotation mechanism as claimed in claim 1, wherein the connection members are screws.

8. The rotation mechanism as claimed in claim 1, wherein the box has a limitation slot and the positioning rod is movably inserted in the limitation slot.

9. The rotation mechanism as claimed in claim 1, wherein the driving member is a motor.

10. The rotation mechanism as claimed in claim 1, wherein the rack has a connection hole through which the pivot extends.

* * * * *